Figure 1:
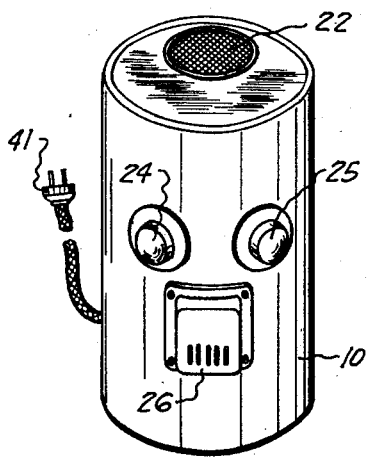

April 4, 1944.　　M. M. ROBERTSON ET AL　　2,345,772
GAS DETECTING APPARATUS
Filed March 23, 1940　　2 Sheets-Sheet 1

Inventors
Malva M. Robertson
Roy R. Douglas

By Jack Athley
Attorney

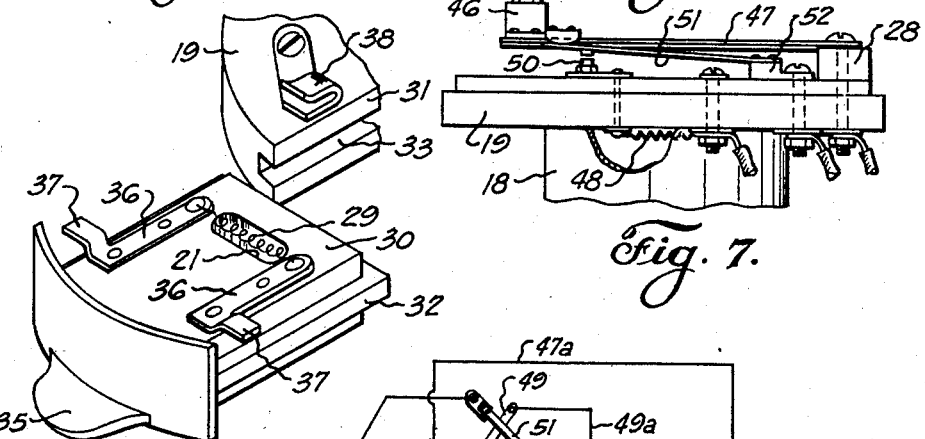
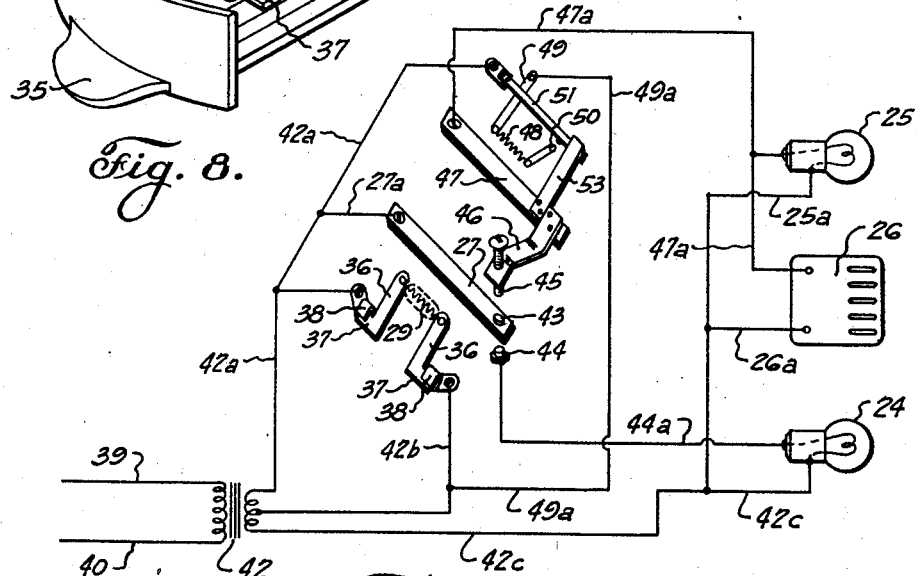

Patented Apr. 4, 1944

2,345,772

UNITED STATES PATENT OFFICE 2,345,772

GAS DETECTING APPARATUS

Malva M. Robertson, Dallas, and Roy R. Douglas, Van, Tex., assignors to W. L. Garland, Grand Saline, Tex.

Application March 23, 1940, Serial No. 325,534

7 Claims. (Cl. 177—311)

This invention relates to new and useful improvements in gas detecting apparatus.

One object of the invention is to provide an improved apparatus having means for immediately and accurately detecting and indicating the presence of inflammable or explosive vapors or gases within a room, or other enclosure; said apparatus being readily portable and also being simple and compact in construction and requiring a minimum space for installation, whereby it is adaptable for use in private homes, as well as in factories, shops and other commercial establishments.

An important object of the invention is to provide an improved gas detecting and indicating apparatus wherein a heating coil is associated with a heat responsive element to control the position thereof, said element, in turn, controlling the actuation of a signal device; the heating coil being constantly exposed to the air within the room or enclosure, whereby any inflammable gas or vapors present in such air contact the coil and are ignited to increase the heat acting on the heat responsive element, with the result that the signal is operated to indicate the presence of the inflammable mixture.

A particular object of the invention is to provide a gas detecting apparatus wherein a heat responsive element is employed for controlling the operation of the signal, together with means associated with the heat responsive element for automatically compensating changes in atmospheric temperatures, whereby the apparatus is not affected by atmospheric temperatures and will efficiently operate throughout a wide temperature range without requiring adjustment.

Another object of the invention is to provide an apparatus, of the character described, having an auxiliary heating unit for maintaining the temperature of the air contacting the heat responsive elements of the device at a predetermined temperature which is sufficiently high to prevent extremely cold atmospheric temperatures from impairing efficient operation.

A further object of the invention is to provide an improved apparatus for detecting and indicating the presence of inflammable vapors or gases within an enclosure, including an improved electrical circuit and control, whereby a visible signal is actuated when the device is inoperative with current flowing therethrough and also whereby a visible, as well as an audible, signal is operated when an inflammable mixture is present in the enclosure.

A construction designed to carry out the invention will be hereinafter described together with other features of the invention.

Figure 2:
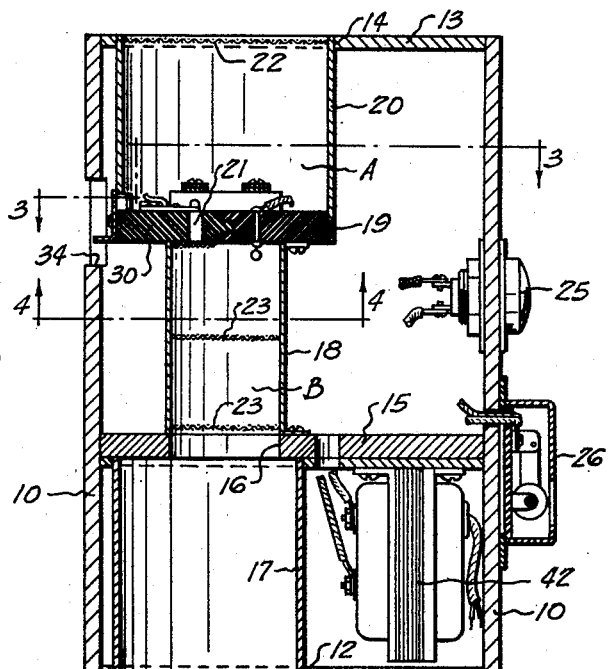
Figure 4:
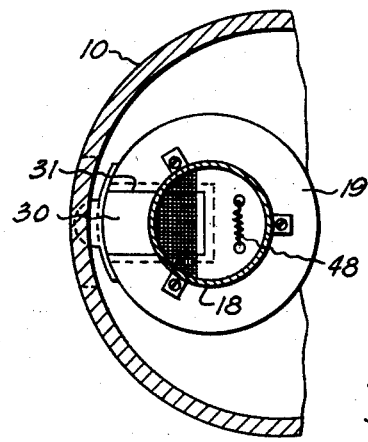
Figure 3:
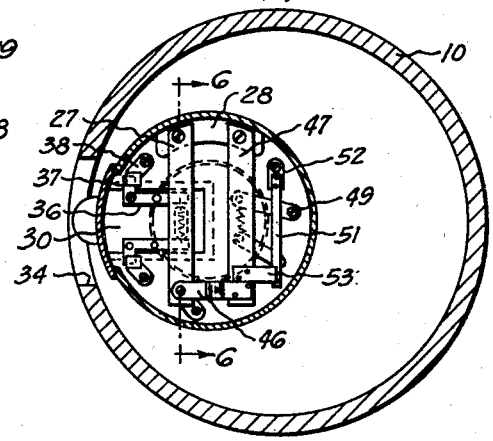

The invention will be more readily understood from a reading of the following specification and by reference to the accompanying drawings, in which an example of the invention is shown, and wherein:

Figure 1 is an isometric view of a gas detecting and indicating apparatus, constructed in accordance with the invention, Figure 2 is an enlarged, transverse, vertical, sectional view of the same, Figure 3 is a horizontal, cross-sectional view, taken on the line 3—3 of Figure 2, Figure 4 is a horizontal, cross-sectional view, taken on the line 4—4 of Figure 2, Figure 5 is an enlarged elevation of the supporting disk on which the control elements are mounted, Figure 6 is a transverse, vertical, sectional view, taken on the line 6—6 of Figure 3, Figure 7 is an elevation of the supporting disk, as viewed from the side opposite the parts as shown in Figure 6 and at a right angle to Figure 5, Figure 8 is an isometric view of the removable heating coil, and Figure 9 is a wiring diagram.

In the drawings, the numeral 10 designates a casing or housing which has been illustrated as cylindrical but which may be of any desired shape. The bottom 11 of the housing is closed except for an enlarged opening 12 located at one side thereof and the top 13 is similarly closed, also being provided with an enlarged opening 14 which is disposed nearer one side of said top. A transverse partition 15 extends across the interior of the housing or casing and is preferably below mid-height of said housing. This partition is formed with an opening 16, which is of a smaller diameter than, and is vertically alined with, the opening 12 in the bottom of the housing. A cylindrical sleeve 17 surrounds the opening 12 and extends upwardly to the underside of the partition, to which it is secured, and said sleeve provides a passage for conducting air upwardly through the opening 16 of the partition.

A cylindrical pipe or conductor 18 surrounds the opening 16 in the partition and is disposed vertically within the housing. The pipe or conductor 18, which is suitably secured to the top of the partition, supports a disk or plate 19, which is constructed of electrical insulating material. This disk has the control mechanism, which will be hereinafter described, mounted thereon and a cylindrical collar 20 surrounds the disk and extends upwardly to the top 13 of the housing, the upper end of the collar being secured within the opening 14 in said top. Manifestly, the interior of the collar above the disk 19 forms a chamber A, while the interior of the conductor below said disk forms a chamber B, and these chambers communicate with each other through a narrow slot 21 provided in the disk. Thus, air may enter the opening 12 in the bottom of the housing and may flow upwardly successively through the sleeve 17, chamber B, slot 21, chamber A and then escape through the opening 14 in the top of said housing. A suitable fire screen 22 is mounted in the discharge opening 14 and similar screens 23 extend transversely across the chamber B, whereby an ignition or burning of any mixture within the chamber A cannot pass from this chamber into the atmosphere exteriorly of the housing.

A pair of electric signal lamps or lights 24 and 25 are mounted in the outside wall of the housing so as to be clearly visible from the exterior thereof. The lamps may be of any suitable size or shape and are preferably of different colors. For the purposes of this description, it will be assumed that the lamp 24 is "green" while the lamp 25 is "red." Below the lamps, an audible signal 26, such as a buzzer or bell, is mounted on the wall of the housing and this buzzer is arranged to be sounded simultaneously with the illumination of the "red" signal lamp.

In the operation of the apparatus, both signal lamps are extinguished when no current is flowing through the device. Upon the setting up of current flow, the "green" lamp 24 is lighted to indicate to the observer that current is flowing through the apparatus but that the device has not reached operating position. After a short period and upon the proper positioning of certain of the operating parts, as will be explained, the "green" lamp is extinguished. Whenever an inflammable mixture enters the chamber A, the "red" lamp 25 is lighted, and simultaneously therewith the audible signal 26 is sounded to indicate the presence of such inflammable mixture. As soon as the inflammable mixture is removed from the enclosure or room and also from the chamber A through which it circulates, the lamp 25 is extinguished and the alarm shut off. Of course, if at any time, the operating parts move out of proper position while current is flowing through the apparatus, the "green" light 24 is automatically illuminated to advise the observer of this condition.

The control mechanism for controlling the operation of the signals 24, 25 and 26, is mounted on the disk 19 and includes a thermostatic arm 27 which has one end secured to an insulated block 28. The thermostatic arm overlies an electrical heating coil 29 which is mounted in the opening 21 which establishes communication between the chambers A and B. When the coil is energized, the heat therefrom affects the thermostatic arm 27 and said coil is of a predetermined size and capacity and gives off a predetermined heat in the presence of air so as to normally move the arm to a predetermined position. Since the coil is relatively light and requires replacement, it is preferable to mount the coil on a drawer-like section 30 of the disk, as is clearly shown in Figure 8. This section is arranged to fit within a recess 31 formed in the disk and said section has longitudinal tongues or ribs 32 which engage grooves 33 provided in the side walls of said recess, whereby the section is supported in position. The removable section is removed and replaced through an opening 34 in the side wall of the housing 10 and a handle 35 may be provided on the section to facilitate such removal and replacement.

The heating coil 29 which spans the opening 21 has its ends secured to contacts 36 which have outwardly extending lugs 37 preferably formed integral therewith. When the section is in position within the recess 31 of the disk, the lugs 37 engage within spring clips 38, which are connected to the source of current supply, as will be explained. Thus, it is obvious that the insertion of the section 30 connects the heating coil mounted thereon with the clips 38, whereby current may be conducted to said coil.

Current is supplied to the apparatus through supply wires 39 and 40, which have their outer ends connected to the usual electrical plug 41 (Figure 1). The supply wires 39 and 40 are connected to a transformer 42, which transformer is mounted in the lower end of the housing 10, being secured to the underside of the partition 15, as is clearly shown in Figure 2. The transformer is provided for the purpose of stepping down the voltage so as to supply a predetermined voltage to the various operating parts. One side of the secondary of the transformer 42 is connected through a wire 42a with one of the spring clips 38. The other spring clip has connection through a wire 42b with the central portion of the secondary coil of said transformer and, thus, a current is transmitted over the wires 42a and 42b and through the spring clips 38 and contacts 36 to the heating coil 29.

The thermostatic element 27 has one end connected by a wire 27a to the wire 42a which leads from one side of the secondary coil of the transformer 42. The construction of the thermostatic arm 27 is such that when the coil 29 is de-energized and said arm is cool, the arm is in a lowermost position and has a contact 43 on its outer end engaged with a contact 44, the latter being mounted on the disk 19 below the arm. The contact 44 has connection through a wire 44a with the "green" lamp 24. The other side of the "green" lamp 24 is connected through a wire 42c to the opposite side of the secondary coil of the transformer 42. Thus, when the thermostatic arm 27 is cooled and the coil 29 is inoperative or de-energized, the contact 43 of said arm closes a circuit through its engagement with the contact 44 to the "green" lamp 24. Therefore, the "green" lamp is illuminated at such time as the heating coil 29 is de-energized, or for any other reason inoperative.

When the heating coil 29 is energized and heats the thermostatic arm 27, said arm is raised upwardly off of the contact 44 so as to break the circuit to the "green" lamp 24. When said "green" lamp is extinguished, and current is flowing through the apparatus, the operator is advised that the heating coil 29 is functioning properly.

The thermostatic arm 27 is so constructed that when the heating coil 29 is operating under normal conditions and while being contacted by the air flowing upwardly through the housing 10, said arm is held upwardly off of the contact 44 and is also spaced below a second contact 45 which is located thereabove. The contact 45 is in the form of a screw which is threaded through a metallic bracket 46. The bracket is secured to the outer end of a second thermostatic arm 47 which arm has its inner end mounted on the insulating block 28, as is clearly shown in Figure 3. The inner end of the second thermostatic arm or bar 47 is electrically connected through a wire 47a with one side of the "red" signal lamp 25 and also with one side of the audible signal or buzzer 26. The other side of the lamp 25 has connection through a wire 25a with the wire 42c leading to one side of the transformer 42. Similarly, the opposite side of the buzzer is connected to this side of the transformer through a wire 26a which ties into the wire 25a. With this arrangement, it will be obvious that when the thermostatic arm 27 moves upwardly into engagement with the contact screw 45, a circuit is closed from one side of the transformer coil through the wire 42a, thermostatic arm 27, screw 45, bracket 46, thermostatic arm 47, wires 47a, 25a, 26a and finally through the wire 42c to the other side of the transformer. Thus, current is directed through the "red" signal lamp 25 to illuminate the same and is simultaneously conducted through the buzzer 26 to sound said buzzer. Therefore, whenever the thermostatic arm 27 moves upwardly into contact with the screw 45, the "red" signal lamp is illuminated and the buzzer 26 is actuated.

In the operation of the device, and with the parts inoperative with no current flow, the thermostatic arm 27 is cooled and is resting in engagement with the contact 44. The thermostatic element 47, which is affected only by the temperature within the chamber A, is of course holding the contact screw upwardly in spaced relation to the contact arm 27. When the current is turned on, the heating coil 29 is energized and since air is flowing upwardly through the chambers B and A and past this coil, said coil will give off a predetermined heat which will affect the thermostatic arm 27. As soon as the current started flowing to the apparatus, the "green" lamp 24 was illuminated, due to the engagement of the contacts 43 and 44. As the coil 29 gives off its heat, the thermostatic arm 27 is heated and distorted upwardly out of engagement with the contact 44. The heat which is given off from the coil, as well as the construction of the thermostatic arm, is such that the arm moves to a position intermediate between the contacts 44 and 45. In other words, the heat which is given off by the coil 29 when in contact with normal air is insufficient to distort the arm 27 into engagement with the upper contact 45.

Whenever a gas becomes admixed with the air flowing upwardly through the housing and past the coil, such gas contacts the said coil since it must pass through the opening 21 which is spanned by the same. This gas is ignited by the coil with the result that an additional heat flows from said coil and this additional heat is sufficient to further distort the thermostatic arm 27. Such further distortion of said arm causes the same to move upwardly and engage the contact screw 45, as has been explained.

Engagement of the contact 43 on the arm 27 with the upper contact 45 results in the closing of a circuit to the "red" signal lamp 25 and also to the audible signal or buzzer 26, whereby these elements are operated to advise the observer that the gas is present in the air circulating through the device. The parts will, of course, remain in this position until such time as the gas is removed from the mixture flowing upwardly through the housing or until the current to the apparatus is shut off. When such condition occurs, the thermostatic arm 27 will be disengaged from the upper contact 45.

From the foregoing, it will be seen that the heating coil 29 is utilized to control the position of the thermostatic arm 27 and thereby control the operation of the various signals. When the air flowing through the chambers A and B of the housing 10 is such as to have no inflammable gas or vapor content, then the heat which is given off by the coil is only sufficient to hold the thermostatic arm in a position intermediate the contacts 44 and 45. Whenever an inflammable gas or vapor becomes admixed with the air circulating through the housing and into contact with the coil 29, said coil serves to ignite the gas, whereby the heat given off by the coil beneath the thermostatic arm 27 is increased. This increased heat further distorts the arm 27 so as to engage the same with the contact 45 and thereby give the alarm indicating the presence of such inflammable gas or vapor.

The coil 29 is operating constantly throughout the operation of the apparatus, and therefore may become burned out or, for other reasons, require replacement. Such replacement may be readily accomplished by merely removing the drawer-like section 30 and replacing the coil 29, after which said section may be returned to position in the recess 31 of the disk 19.

Since the thermostatic arm 27 is subject to temperature conditions of the air, in addition to the heat given off by the coil 29, it will be manifest that under extreme temperature conditions, said arm may be distorted beyond the position to which it is capable of moving under the heat of the coil alone. Therefore, if the temperature within the room became excessively high, then the hot air circulating through the housing might distort the thermostatic arm 27 into engagement with the upper contact 45 and thereby give a false alarm. However, to overcome this disadvantage, the thermostatic arm 47, which carries the upper contact 45, is provided. Obviously, any heat of the air circulating through the housing which will affect the distortion of the control arm 27 will also affect the second thermostatic arm 47. Thus, as the arm 27 is moved upwardly by an excessive heat of the air, the arm 47 is also moved upwardly, whereby the contact 45 is always maintained in its proper spaced relation to the contact 43 carried by the arm 27. With this arrangement, it will be obvious that in the event the air reaches a high temperature, the operation of the device will not be affected.

In the event that the temperature of the air falls to a relatively low degree, the arm 27 will be cooled somewhat and will be lowered from its normal intermediate position between the contacts 44 and 45. However, since the coil 29 is immediately below the arm, said coil will always give off sufficient heat to maintain the arm 27 out of engagement with the lower contact 44. The cooling of the arm by the cold air will move said arm downwardly away from the contact 45 but, since said contact is carried by the second thermostatic arm 47, the proper spacing between these parts will be maintained. In unusual cases, the temperature of the air may fall to freezing or below, in which event the small coil 29 would not be sufficient to prevent engagement of the arm 27 with the lower contact 44. To prevent such disengagement and to provide additional heat under such condition, an auxiliary heating coil 48 is provided and this heating coil is mounted on the underside of the disk 19 within the upper portion of the chamber B.

The auxiliary heating coil 48 has one end connected to a contact 49, which contact is connected through a wire 49a with the wire 42b which leads to the central portion of the secondary coil of the transformer. The other side of the coil has connection with a contact 50 which is arranged to be engaged by a spring arm 51 which overlies said contact. The spring arm is fastened on a block 52 secured to the upper end of the disk 19 and is electrically connected to the wire 42a which leads to one side of the transformer coil. The contact arm 51 is normally in a position disengaged from the contact 50 and overlying this arm is a bracket or lug 53 which is secured to the thermostatic arm 47. When the thermostatic arm 47 moves downwardly a predetermined distance, the bracket or lug 53 moves the switch arm 51 downwardly to engage the same with the contact 50 and thereby complete a circuit to the heating coil 48. Of course, when the heating coil 48 is operated, an auxiliary heating means is provided which heats the air passing through the chamber B so as to raise the temperature of this air.

It will be evident that if excessively low temperatures of the air circulating the housing are encountered, the thermostatic arms 27 and 47 are moved downwardly due to the cooling thereof. When these arms move downwardly a predetermined distance and before the contact 43 on the arm 27 engages the contact 44, the arm 47 has moved the contact member 51 into engagement with the contact 50 so as to energize the auxiliary heating coil 48. Such energization of this coil results in a heating of the air in the chamber B and thus the air which contacts the coil 29 and the thermostatic element in the chamber A is of a higher temperature so as to prevent further downward movement of the arm 27. Therefore, the arrangement positively prevents the contact 43 engaging the contact 44 due to an excessive low temperature of the air and, thus, a false alarm will not be sounded merely because of the temperature of said air.

The device is relatively simple in construction and is very compact, with all of the operating parts housed within the single casing or housing 10. In using the apparatus, it is, of course, preferable that the housing be located near the upper end of the room or enclosure so that the presence of the inflammable gas or vapor in the air may be immediately determined. The provision of the fire screens 22 and 23, which are associated with the chambers A and B prevent the flames or ignition which takes place adjacent the coil 29 from passing into the air within the room or enclosure.

The foregoing description of the invention is explanatory thereof and various changes in the size, shape and materials, as well as in the details of the illustrated construction may be made, within the scope of the appended claims, without departing from the spirit of the invention.

What we claim and desire to secure by Letters Patent is:

1. A gas detecting apparatus including, a housing having a restricted passage through which air is adapted to circulate, an electrical visible signal, a combined electrical visible and audible signal, a thermostatic element connected in the electrical circuits of the signals and arranged to close the circuit to the visible signal when in a normal undistorted position and arranged to close the circuit to the combined visible and audible signal when in an extreme distorted position, said element holding both circuits open when in a partially distorted intermediate position, and heating means disposed in the path of the air circulating through the passage for heating the thermostatic element to normally maintain the element in an intermediate position, the last named means serving to ignite any inflammable gas circulating through the passage with the air, whereby additional heat is applied to the thermostatic element to move the element to its extreme distorted position to close the circuit to the combined visible and audible signal and actuate the same for indicating the presence of such inflammable gas.

2. A gas detecting apparatus including, a housing having a restricted passage through which air is adapted to circulate, an electrical signal mounted on the housing, a heat responsive element connected in the electrical circuit of the signal for controlling the actuation of said signal, heating means disposed in the path of the air circulating through the passage for heating the heat responsive element and controlling its position, the last named means being arranged to ignite any inflammable gas circulating through the passage with the air, whereby additional heat is applied to the heat responsive element to move said element to a position closing the circuit to the signal to actuate the same and thereby indicate the presence of such inflammable gas, and an auxiliary heating means within the passage and controlled in its operation by the heat responsive element which actuates the signal, whereby when the heat responsive element is cooled to a predetermined degree by the air circulating through the passage, the auxiliary heating means is operated to heat said circulating air.

3. A gas detecting apparatus including, a housing having a restricted passage through which air is adapted to circulate, an electrical visible signal, a combined electrical visible and audible signal, a thermostatic element connected in the electrical circuits of the signals and arranged to close the circuit to the visible signal when in a normal undistorted position and arranged to close the circuit to the combined visible and audible signal when in an extreme distorted position, said element holding both circuits open when in a partially distorted intermediate position, heating means disposed in the path of the air circulating through the passage for heating the thermostatic element to normally maintain the element in an intermediate position, the last named means serving to ignite any inflammable gas circulating through the passage with the air, whereby additional heat is applied to the thermostatic element to move the element to its extreme distorted position to close the circuit to the combined visible and audible signal and actuate the same for indicating the presence of such inflammable gas, and an auxiliary heating means within the passage arranged to be operated when the temperature of the circulating air falls to a predetermined point, whereby the temperature of the air within the passage is maintained sufficiently high to prevent undue cooling of the thermostatic element while the first named means is operating.

4. A gas detecting and indicating apparatus including, a housing having a passage through which air is circulated, an electrical signal mounted on the housing, a second electrical signal also mounted on the housing, means for connecting one side of each signal to a source of current supply, a fixed contact connected with the other side of the first signal, a movable contact connected to the other side of the second signal, a thermostatic switch arm having connection with the source of current supply and movable between the contacts to close the circuits to one or the other of the signals, the switch arm engaging the fixed contact when in a normal undistorted position to illuminate the first signal and engaging the movable contact when in an extreme distorted position to illuminate the second signal, said arm holding both circuits open when in a partially distorted position intermediate between the contacts, heating means disposed in the path of the air circulating through the passage for heating the thermostatic arm to normally maintain the arm in an intermediate position, the heating means serving to ignite any inflammable gas which circulates through the passage with the air, whereby additional heat is applied to the thermostatic arm to move the same to an extreme distorted position in engagement with the movable contact to close the circuit to the second signal and thereby actuate the same to indicate the presence of the inflammable gas, and a second thermostatic arm on which the movable contact is mounted, said arm being unaffected by the heating means and being controlled by the temperature of the surrounding air, whereby any variation in temperature which affects the position of the first thermostatic control arm also affects said second arm to maintain a predetermined spacing between the control arm and movable contact under all temperature conditions.

5. A gas detecting and indicating apparatus including, a housing having a passage through which air is circulated, an electrical signal mounted on the housing, a second electrical signal also mounted on the housing, means for connecting one side of each signal to a source of current supply, a fixed contact connected with the other side of the first signal, a movable contact connected to the other side of the second signal, a thermostatic switch arm having connection with the source of current supply and movable between the contacts to close the circuits to one or the other of the signals, the switch arm engaging the fixed contact when in a normal undistorted position to illuminate the first signal and engaging the movable contact when in an extreme distorted position to illuminate the second signal, said arm holding both circuits open when in a partially distorted position intermediate between the contacts, heating means disposed in the path of the air circulating through the passage for heating the thermostatic arm to normally maintain the arm in an intermediate position, the heating means serving to ignite any inflammable gas which circulates through the passage with the air, whereby additional heat is applied to the thermostatic arm to move the same to an extreme distorted position in engagement with the movable contact to close the circuit to the second signal and thereby actuate the same to indicate the presence of the inflammable gas, a second thermostatic arm on which the movable contact is mounted, said arm being unaffected by the heating means and being controlled by the temperature of the surrounding air, whereby any variation in temperature which affects the position of the first thermostatic control arm also affects said second arm to maintain a predetermined spacing between the control arm and movable contact under all temperature conditions, and an auxiliary heating coil within the passage actuated when the second thermostatic arm is cooled to a predetermined degree by the air within the passage for maintaining the temperature of said air above a predetermined point.

6. A gas detecting apparatus including, a housing having a passage through which air is adapted to circulate, an electrical visible signal, a combined electrical visible and audible signal, a thermostatic element connected in the electrical circuits of the signals and arranged to close the circuit to the visible signal when in a normal undistorted position and arranged to close the circuit to the combined visible and audible signal when in an extreme distorted position, said element holding both circuits open when in a partially distorted intermediate position, a support removably mounted within the housing and extending across the passage, and a heating coil mounted in the opening of the support and disposed in the path of the air circulating through the passage for heating the thermostatic element to normally maintain the element in an intermediate position, the heating coil serving to ignite any inflammable gas circulating through the passage with the air, whereby additional heat is applied to the thermostatic element to move the element to its extreme distorted position to close the circuit to the combined visible and audible signal and actuate the same for indicating the presence of such inflammable gas.

7. A gas detecting apparatus including, a housing having a passage through which air is adapted to circulate, an electrical operating signal, a second electrical alarm signal, a thermostatic element connected in the electrical circuits of the signals and arranged to close the circuits to the operating signal when in a normal undistorted position and arranged to close the circuit to the alarm signal when in an extreme distorted position, said element holding both circuits open when in a partially distorted intermediate position, and heating means disposed in the path of the air circulating through the passage for heating the thermostatic element to normally maintain said element in an intermediate position, the last named means serving to ignite any inflammable gas circulating through the passage with the air, whereby additional heat is applied to the thermostatic element to move said element to its extreme distorted position to close the circuit to the alarm signal and actuate the same to indicate the presence of such inflammable gas.

MALVA M. ROBERTSON.
ROY R. DOUGLAS.